United States Patent [19]

Mintenko et al.

[11] Patent Number: 5,049,031
[45] Date of Patent: Sep. 17, 1991

[54] QUICK REMOVAL APPARTAUS AND METHOD FOR LANTERN RINGS AND PACKING IN PUMP ASSEMBLIES

[75] Inventors: William Mintenko; Frank Protz, both of Prince George, Canada

[73] Assignee: Zee Impeller Breaker Inc., British Columbia, Canada

[21] Appl. No.: 520,470

[22] Filed: May 8, 1990

[30] Foreign Application Priority Data

May 19, 1989 [CA] Canada .................................. 600169

[51] Int. Cl.$^5$ .............................................. F01D 11/00
[52] U.S. Cl. ..................................... 415/112; 415/201; 415/214.1; 415/230; 29/426.1; 29/426.5; 29/888.024; 277/9; 277/9.5
[58] Field of Search ............ 415/110, 111, 112, 168.1, 415/170.1, 229, 230, 201, 214.1; 277/1, 9, 9.5, 10; 29/888.024, 888.3, 433, 426.1, 426.5

[56] References Cited

U.S. PATENT DOCUMENTS

| | | |
|---|---|---|
| 1,460,041 | 9/1921 | Smith . |
| 1,794,662 | 3/1931 | Zerr ...................................... 277/10 |
| 3,101,199 | 8/1963 | Hartnagel ............................. 277/9 |
| 3,961,799 | 6/1976 | Peet . |
| 4,394,872 | 7/1983 | Schobl . |
| 4,496,281 | 1/1985 | Noack .............................. 415/214.1 |

FOREIGN PATENT DOCUMENTS

| | | |
|---|---|---|
| 2263402 | 10/1975 | France ................................ 415/111 |
| 0047196 | 3/1983 | Japan ................................. 415/110 |

Primary Examiner—Edward K. Look
Assistant Examiner—Christopher M. Verdier
Attorney, Agent, or Firm—Limbach, Limbach & Sutton

[57] ABSTRACT

The present invention provides a system for facilitating the removal of the lantern ring and packing in pump assemblies. Previously a steel hook was used to scrape away the worn packing. The present invention provides a series of cables extending through the lantern ring which permit the lantern ring and packing to be easily pulled out when replacement is required.

6 Claims, 3 Drawing Sheets

QUICK REMOVAL APPARTAUS AND METHOD FOR LANTERN RINGS AND PACKING IN PUMP ASSEMBLIES

BACKGROUND OF THE INVENTION

Pump assemblies typically use a system consisting of packing, a lantern ring and a gland around the drive shaft for the pump impeller to allow for cooling and lubrication of the rotating shaft without allowing the stock which is being pumped to contaminate the lubricated area. The lantern ring is a ring having a number of apertures which allow lubrication to be forced into the area of the rotating shaft. In order to prevent leakage around the shaft, packing is forced tightly against the lantern ring around the shaft. An annular gland is used to tighten the packing against the lantern ring. When a leak develops, the gland is tightened further to compress the packing in more tightly, until eventually it is necessary to remove and replace the packing.

In the past, removal of the packing has been carried out using a "packing puller" which is a tool having a rigid handle and a hardened steel hook at one end of the handle. This tool is used to scrape and pull away at the packing until it is all removed. This is a difficult and time-consuming job. There is therefore a need for an improved apparatus and method for removing the lantern ring and packing from a pump.

SUMMARY OF THE INVENTION

The present invention provides an apparatus and method for facilitating the removal and replacement of the lantern ring and packing in a pump assembly. The method involves providing a plurality of corresponding holes in the gland and lantern ring and a plurality of flexible cables sized to fit through such holes. One end of each cable has an enlargement greater in diameter than such holes to prevent the cables being pulled completely through the lantern ring. The cables are pulled through the holes in the lantern ring in one direction and the lantern ring is then installed around the pump drive shaft in the usual way. Packing is then installed around the shaft and the gland is then installed in the usual way after the cables have been threaded through the corresponding holes in the gland.

To remove and replace the lantern ring and packing, it is then a simple matter of releasing the gland and pulling the ends of the cables by means of an appropriate tool, thereby pulling out the lantern ring and packing.

The invention comprises, in a pump assembly having an impeller-driving shaft, a lantern ring and a gland mounted coaxially at spaced locations on said shaft and packing means provided between said lantern ring and said gland, the improvement comprising providing the gland and the lantern ring with a plurality of holes aligned parallel to the axis of the shaft and providing a plurality of flexible cables each having a free end and an end provided with stop means having a sufficient diameter to prevent passage through the holes in the lantern ring, whereby the stop means of each cable abuts against the lantern ring and the free end of each cable extending through holes in the lantern ring and the gland.

The invention further comprises a method of removing a lantern ring from a stuffing box of a pump assembly having an impeller-driving shaft, a lantern ring and a gland mounted coaxially at spaced locations on the shaft and packing means provided between the lantern ring and the gland, comprising: a) providing the gland and the lantern ring with a plurality of holes aligned parallel to the axis of the shaft; b) providing plurality of flexible cables each having a free end and an end provided with stop means having a sufficient diameter to prevent passage through the holes in the lantern ring; c) mounting the lantern ring, packing, cables and gland on the shaft whereby the stop means of each cable abuts against the lantern ring and the free end of each cable extends through holes in the lantern ring and the gland; and d) removing the gland and pulling the free ends of the cables to remove the lantern ring.

BRIEF DESCRIPTION OF THE DRAWINGS

In drawings which illustrate a preferred embodiment of the invention.

DETAILED DESCRIPTION OF A PREFERRED EMBODIMENT

Figure 1:
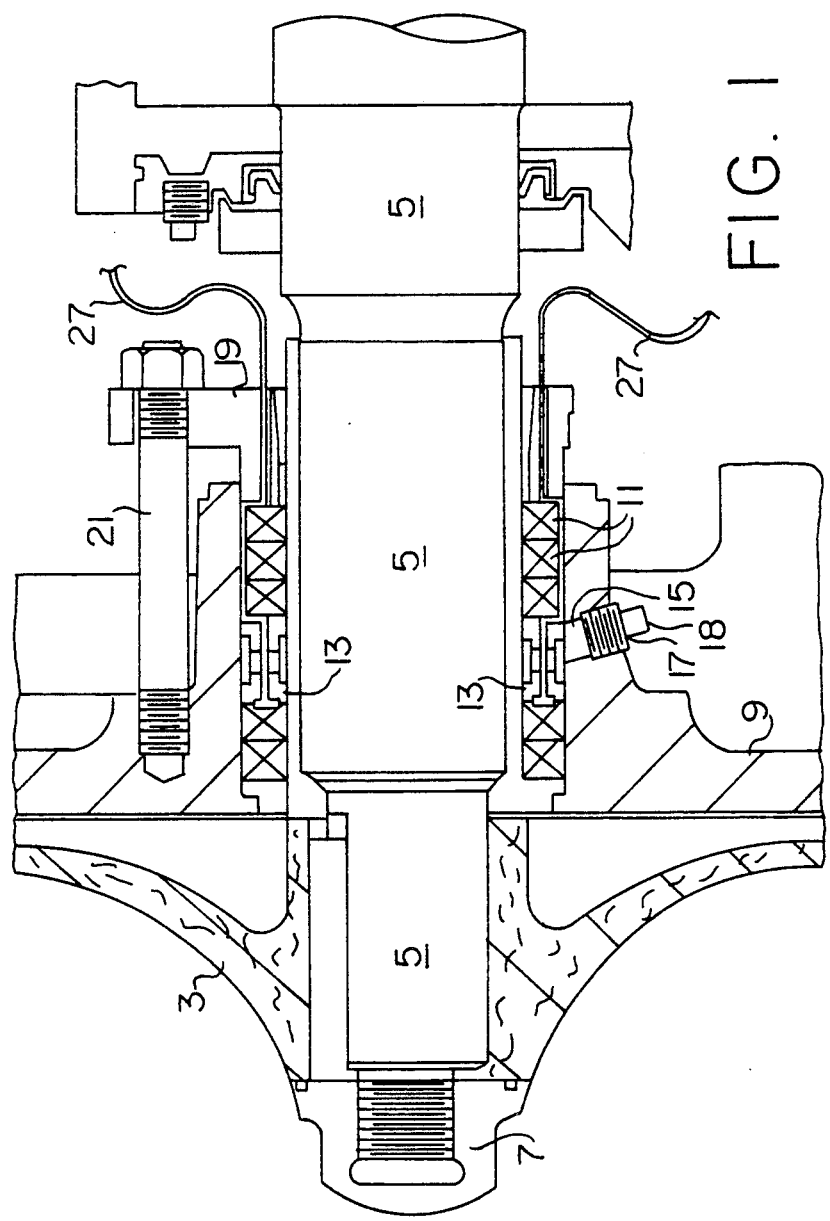
FIG. 1 is a cross-sectional view of a standard pump assembly provided with the lantern ring and packing removal apparatus of the invention.

Referring to FIG. 1, the portion of a pump assembly commonly called the "stuffing box" is shown in cross-section. Pumps of this type are used in many industries for pumping water, chemicals, pulp and other liquids and slurries. The pump impeller is shown as 3. The impeller is mounted on threaded end 7 of drive shaft 5 or may be keyed onto the shaft. The stuffing box cover 9 has a cylindrical space around shaft 5 for receiving the packing rings 11, typically felt, and lantern ring 13. Passageway 15 is provided in the stuffing box cover 9 and has a threaded end 17 for connecting to a line 18 for carrying the flow of lubricant and coolant to allow for the application of lubricating oil to the shaft 5 by way of lantern ring 13. Another line, not shown, carries the lubricating and cooling liquid away from the lantern ring. Gland 19 is tightened against the packing rings 11 by means of bolts 21.

Figure 2:
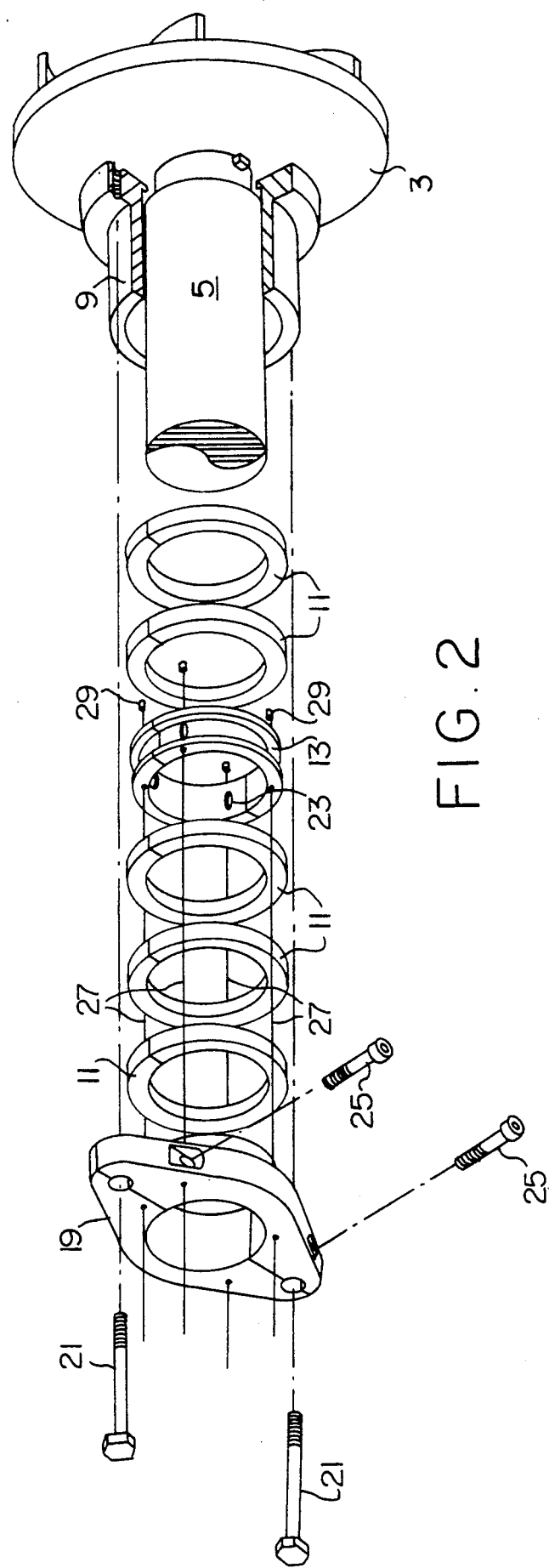
FIG. 2 is a perspective, exploded view of a pump impeller and shaft assembly, partially cut away and in cross-section, provided with the removal apparatus of the embodiment invention shown in FIG. 1.
Figure 3:
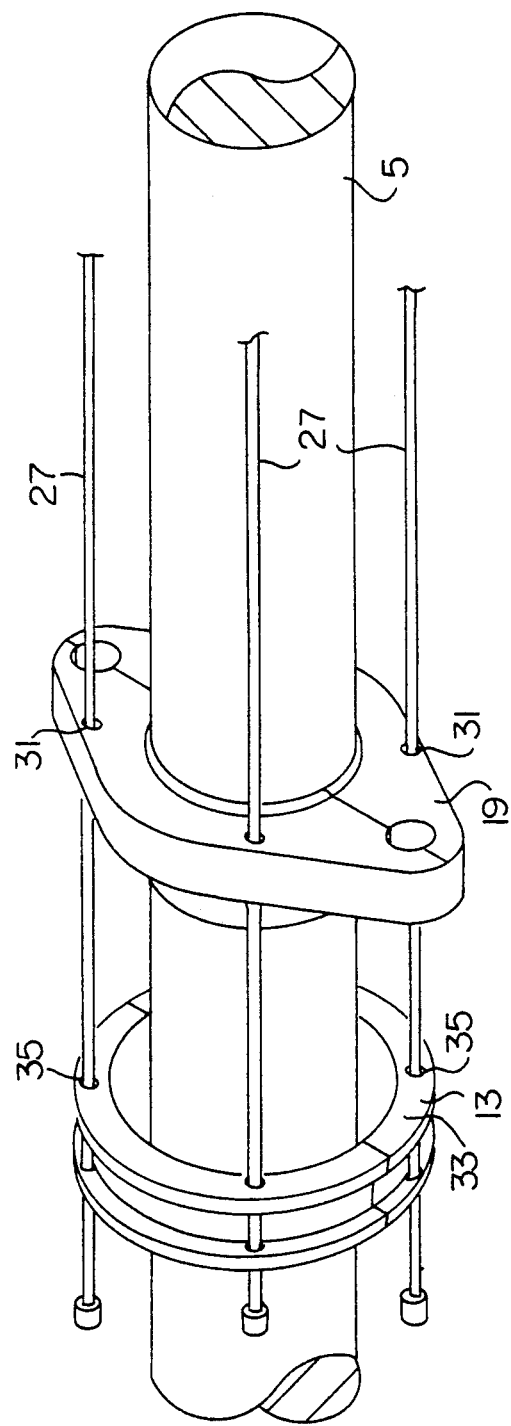
FIG. 3 is a perspective view of the lantern ring, gland and removal cables of the embodiment invention shown in FIG. 1 mounted on a shaft with packing rings removed for illustrative purposes.

As shown in FIG. 2, lantern ring 13 has a number of holes 23 in its outer cylindrical surface to allow for the passage of the lubricating and cooling fluid. The lantern ring is preferably split in half to allow its removal and replacement without the necessity of removing the entire drive shaft. The lantern ring may be made of nylon, plastic, or stainless steel. Gland 19 is similarly split in half, and is held together by bolts 25.

Four flexible steel cables 27 are provided to allow quick removal of the lantern ring and packing. Each cable 27 is provided at one end with a metal enlargement or stopper 29. This stopper can be formed by welding a nut or grommet on the end of the cable. The free end of the cable may be finished with solder. The cable is preferably braided or woven stainless steel 1/32 to 1/16 inches in diameter (or larger depending on the size of the lantern ring). Gland 19 is provided with four holes 31 which are large enough so that the cables are able to pass freely through them, and the two axially extending rims 33 of lantern ring 13 are also provided with four holes 35 large enough to pass the cable freely but too small to allow the stoppers 29 to pass. Such holes in the gland and lantern ring are typically 3/16" in diameter but may vary depending on the size of the lantern ring. The holes in the lantern ring on the side closest the impeller can be countersunk so that the stoppers 29 will fit within the recesses when the cable is pulled taut.

To utilize the invention, the required number of packing rings 11 are first inserted over the shaft 5 in the stuffing box cover 9. Steel cables 27 are inserted through the holes 35 with ends 29 all located on side of the lantern ring closest the impeller. The lantern ring is then inserted over the shaft followed by the appropriate further number of packing rings 11, so that cables 27 lie on the outside surface of the packing rings as shown in FIG. 1. The cables are then threaded through the corresponding holes in gland 19, and the gland is tightened against the packing rings 11 by bolts 21.

When it is necessary to remove the lantern ring and packing, bolts 21 are removed and it is then simply a matter of pulling the free ends 41 of cables 27 either by hand or with an appropriate tool and thereby pulling out lantern ring 13 and the intervening packing rings.

As will be apparent to those skilled in the art, various modifications and adaptations of the structure above described may be made without departing from the spirit of the invention, the scope of which is to be construed in accordance with the accompanying claims.

What is claimed is:

1. In a pump assembly having an impeller-driving shaft, a lantern ring and a gland mounted coaxially at spaced locations on said shaft and packing means provided between said lantern ring and said gland, the improvement comprising providing said gland and said lantern ring with a plurality of holes aligned parallel to the axis of said shaft and providing a plurality of flexible cables each having a free end and an end provided with stop means having a sufficient diameter to prevent passage through said holes in said lantern ring, whereby said stop means of each cable abuts against said lantern ring and said free end of each said cable extends through holes in said lantern ring and said gland.

2. The pump assembly of claim 1 wherein said lantern ring is split to form two halves.

3. The pump assembly of claim 2 wherein said gland is split to form two halves.

4. The pump assembly of claim 1 wherein said flexible cables are metal.

5. The pump assembly of claim 4 wherein said stop means comprises a metal cylinder welded to the end of said cable.

6. A method of removing a lantern ring from a stuffing box of a pump assembly having an impeller-driving shaft, a lantern ring and a gland mounted coaxially at spaced locations on said shaft and packing means provided between said lantern ring and said gland, comprising:

a) providing said gland and said lantern ring with a plurality of holes aligned parallel to the axis of said shaft;

b) providing a plurality of flexible cables each having a free end and an end provided with stop means having a sufficient diameter to prevent passage through said holes in said lantern ring;

c) mounting said lantern ring, packing, cables and gland on said shaft whereby said stop means of each cable abuts against said lantern ring and said free end of each said cable extends through holes in said lantern ring and said gland; and d) removing said gland and pulling said free ends of said cables to remove said lantern ring.

* * * * *